(12) United States Patent
Chiba

(10) Patent No.: US 12,417,704 B2
(45) Date of Patent: Sep. 16, 2025

(54) PARKING LOT, PARKING LOT MANAGEMENT SYSTEM, AND PARKING LOT MANAGEMENT METHOD THAT DETERMINES A USAGE STATUS OF EACH OF A PLURALITY OF PARKING SPACES

(71) Applicant: TOYOTA JIDOSHA KABUSHIKI KAISHA, Toyota (JP)

(72) Inventor: Hiroya Chiba, Fuji (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 57 days.

(21) Appl. No.: 18/371,489

(22) Filed: Sep. 22, 2023

(65) Prior Publication Data

US 2024/0119837 A1    Apr. 11, 2024

(30) Foreign Application Priority Data

Oct. 7, 2022  (JP) ................... 2022-162474

(51) Int. Cl.
  *G08G 1/14*   (2006.01)
  *G06V 20/52*   (2022.01)

(52) U.S. Cl.
  CPC ............ *G08G 1/148* (2013.01); *G06V 20/52* (2022.01); *G06V 2201/07* (2022.01); *G06V 2201/08* (2022.01)

(58) Field of Classification Search
  None
  See application file for complete search history.

(56) References Cited

U.S. PATENT DOCUMENTS

2010/0309024 A1* 12/2010 Mimeault ............... G08G 1/04
  340/932.2

FOREIGN PATENT DOCUMENTS

| JP | H10-97697 A | 4/1998 |
| JP | 2001-126192 A | 5/2001 |
| JP | 2001-202596 A | 7/2001 |
| JP | 2001-344697 A | 12/2001 |
| JP | 2020-144627 A | 9/2020 |

* cited by examiner

*Primary Examiner* — John F Mortell
(74) *Attorney, Agent, or Firm* — Dinsmore & Shohl LLP

(57) ABSTRACT

A parking lot includes: a plurality of parking spaces arranged in series in a first direction; a camera configured to take a picture of the plurality of parking spaces; and a recognition target provided in each of the plurality of parking spaces. A usage status of each parking space is determined based on a result of recognition of the recognition target by the camera. Each parking space includes a first parking space line and a second parking space line. The first parking space line is located closer to the camera than the second parking space line is in the first direction. The recognition target is arranged to be decentered from a center line between the first parking space line and the second parking space line toward a region on a side of the second parking space line.

3 Claims, 10 Drawing Sheets

PARKING LOT, PARKING LOT MANAGEMENT SYSTEM, AND PARKING LOT MANAGEMENT METHOD THAT DETERMINES A USAGE STATUS OF EACH OF A PLURALITY OF PARKING SPACES

CROSS-REFERENCES TO RELATED APPLICATION

The present disclosure claims priority to Japanese Patent Application No. 2022-162474, filed on Oct. 7, 2022, the contents of which application are incorporated herein by reference in their entirety.

TECHNICAL FIELD

The present disclosure relates to a technique for managing a usage status of a parking space in a parking lot.

BACKGROUND ART

Automated Valet Parking (AVP) in a parking lot is known. In the automated valley parking, a parking space is allocated to an entry vehicle that enters the parking lot. The entry vehicle automatically travels to and parks at the allocated parking space without depending on a driving operation by a driver.

More specifically, a parking lot management system uses a camera installed in the parking lot to grasp a usage status (available or in use) of each parking space. For example, a marker is installed in each parking space. The parking lot management system grasps the usage status (available or in use) of a parking space based on whether or not the marker is shown in an image of the parking space captured by the camera. Then, the parking lot management system allocates an available parking space to the entry vehicle.

Patent Literature 1 discloses a state detection device for a parking lot. The state detection device is provided with a means for photographing a parking lot plane from above, a means for detecting presence or absence of a vehicle for each parking position by comparing the photographed image with an available state, and a means for detecting an occupied state based on detection of presence of vehicle at every parking position and detecting an available state based on detection of absence of vehicle at at least one of parking positions.

LIST OF RELATED ART

Patent Literature 1: Japanese Laid-Open Patent Application No. JP-2001-344697

SUMMARY

A case where a parking space in a parking lot is monitored by using a camera is considered. For example, a usage status (available or in use) of a parking space is determined based on an image of the parking space captured by the camera.

There may be a need to monitor a plurality of parking spaces with a single camera in order to reduce costs of parking lot management. However, when a plurality of parking spaces are monitored by using a single camera in a parking lot, a part of a certain parking space may be hidden by a vehicle parked in an adjacent parking space. In other words, influence of occlusion on visibility of the parking space increases. Decrease in the visibility of the parking space causes decrease in accuracy of monitoring the parking space. For example, when a marker provided in an available parking space cannot be seen from the single camera due to the occlusion, it may be erroneously determined that a vehicle is parked in the available parking space.

An object of the present disclosure is to provide a technique capable of suppressing erroneous determination of a usage status of a parking space when a plurality of parking spaces in a parking lot are monitored by a single camera.

A first aspect relates to a parking lot.

The parking lot includes:
  a plurality of parking spaces arranged in series in a first direction;
  a camera configured to take a picture of the plurality of parking spaces; and
  a recognition target provided in each of the plurality of parking spaces.

A usage status of each of the plurality of parking spaces is determined based on a result of recognition of the recognition target by the camera.

Each of the plurality of parking spaces includes a first parking space line and a second parking space line.

The first parking space line is located closer to the camera than the second parking space line is in the first direction.

The recognition target is arranged to be decentered from a center line between the first parking space line and the second parking space line toward a region on a side of the second parking space line.

A second aspect relates to a parking lot management for managing a parking lot.

The parking lot management system includes one or more processors.

The parking lot includes:
  a plurality of parking spaces arranged in series in a first direction;
  a camera configured to take a picture of the plurality of parking spaces; and
  a recognition target provided in each of the plurality of parking spaces.

Each of the plurality of parking spaces includes a first parking space line and a second parking space line.

The first parking space line is located closer to the camera than the second parking space line is in the first direction.

The recognition target is arranged to be decentered from a center line between the first parking space line and the second parking space line toward a region on a side of the second parking space line.

The one or more processors are configured to determine a usage status of each of the plurality of parking spaces based on a result of recognition of the recognition target by the camera.

A third aspect relates to a parking lot management method for managing a parking lot.

The parking lot includes:
  a plurality of parking spaces arranged in series in a first direction;
  a camera configured to take a picture of the plurality of parking spaces; and
  a recognition target provided in each of the plurality of parking spaces.

Each of the plurality of parking spaces includes a first parking space line and a second parking space line.

The first parking space line is located closer to the camera than the second parking space line is in the first direction.

The recognition target is arranged to be decentered from a center line between the first parking space line and the second parking space line toward a region on a side of the second parking space line.

The parking lot management method for managing the parking lot includes determining a usage status of each of the plurality of parking spaces based on a result of recognition of the recognition target by the camera.

According to the present disclosure, it is possible to suppress erroneous determination of a usage status of a parking space even when a plurality of parking spaces in a parking lot are monitored by a single camera.

DETAILED DESCRIPTION

Figure 1:
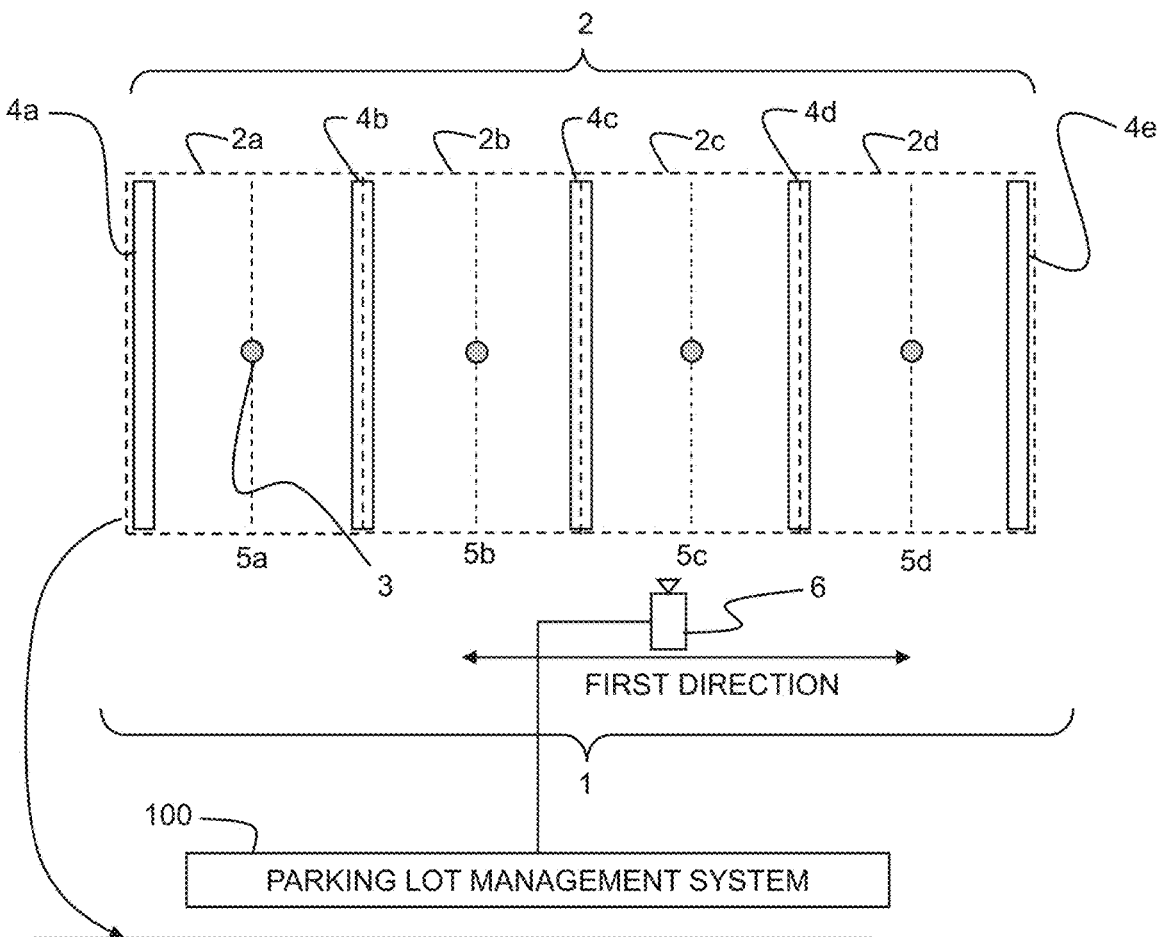
FIG. 1 is a conceptual diagram for explaining an overview of a parking lot according to an embodiment of the present disclosure.
Figure 1:
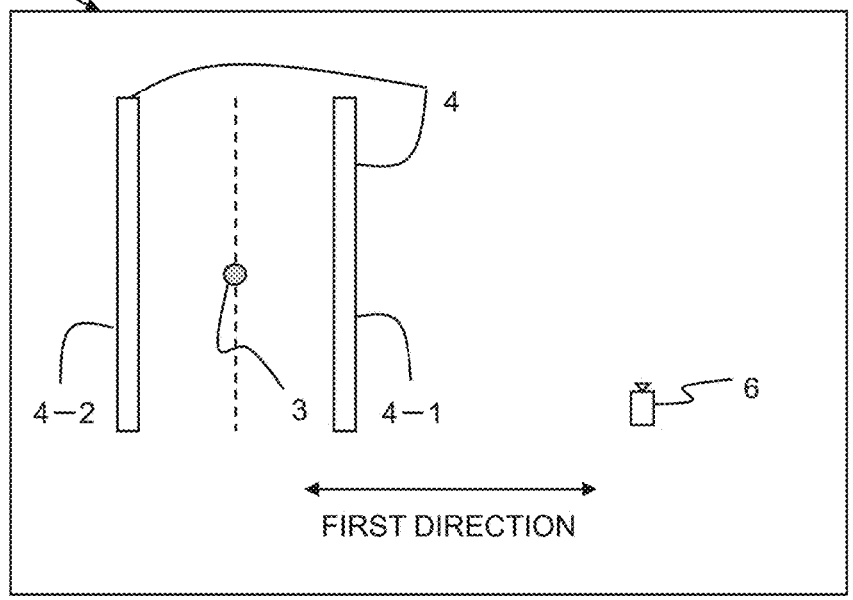

Hereinafter, embodiments of the present disclosure will be described with reference to the accompanying drawings. In the drawings, the same or corresponding parts are denoted by the same reference numerals, and the description thereof will be simplified or omitted.

1. Overview of Parking Lot

FIG. 1 is a conceptual diagram for explaining an overview of a parking lot 1 according to an embodiment of the present disclosure. The parking lot 1 may support automated valley parking.

The parking lot 1 includes a plurality of parking spaces 2. As an example, a plurality of parking spaces 2a to 2d are shown in FIG. 1. The parking lot 1 is provided with a camera 6 for grasping a usage status (available, in use) of the parking spaces 2a to 2d. In the example shown in FIG. 1, the parking spaces 2a to 2d are arranged in series in a first direction.

Each of the plurality of parking spaces 2a to 2d is defined by parking space lines 4. In the example shown in FIG. 1, parking space lines 4a to 4e extend in a direction intersecting the first direction. The parking space lines 4a to 4e may extend in a direction orthogonal to the first direction. The parking space 2a is a region sandwiched between two parking space lines 4a and 4b. The parking space 2b is a region sandwiched between two parking space lines 4b and 4c. The parking space 2c is a region sandwiched between two parking space lines 4c and 4d. The parking space 2d is a region sandwiched between two parking space lines 4d and 4e.

In the example shown in FIG. 1, the camera 6 is located above the parking space 2c. The parking space 2b is adjacent to the parking space 2c and is located at a position farther from the camera 6 than the parking space 2c is. The parking space 2d is adjacent to the parking space 2c and is located at a position farther from the camera 6 than the parking space 2c is. The parking space 2a is adjacent to the parking space 2b and is located at a position farther from the camera 6 than the parking space 2b is.

In each parking space 2, a parking space line 4 closer to the camera 6 is hereinafter referred to as a "first parking space line 4-1", and a parking space line 4 farther from the camera 6 is hereinafter referred to as a "second parking space line 4-2." That is, the first parking space line 4-1 is located closer to the camera 6 than the second parking space line 4-2 is in the first direction. For example, as to the parking space 2a, the parking space line 4b is the first parking space line 4-1, and the parking space line 4a is the second parking space line 4-2.

Each parking space line may serve as both the first parking space line 4-1 and the second parking space line 4-2. For example, the parking space line 4b is the first parking space line 4-1 when viewed from the parking space 2a, and is the second parking space line 4-2 when viewed from the parking space 2b.

Each parking space line may serve as the first parking space lines 4-1 of the plurality of parking spaces 2. For example, the parking space line 4c is the first parking space line 4-1 when viewed from the parking space 2b, and is also the first parking space line 4-1 when viewed from the parking space 2c.

A parking lot management system 100 manages the parking lot 1. For example, the parking lot management system 100 uses the camera 6 to grasp the usage status (available or in use) of each parking space 2. The parking lot management system 100 is communicably connected to the camera 6. The camera 6 takes a picture of the parking spaces 2a to 2d and transmits an image of the parking spaces 2a to 2d to the parking lot management system 100. The parking lot management system 100 determines the usage status of each of the parking spaces 2a to 2d based on the image captured by the camera 6.

Figure 2:
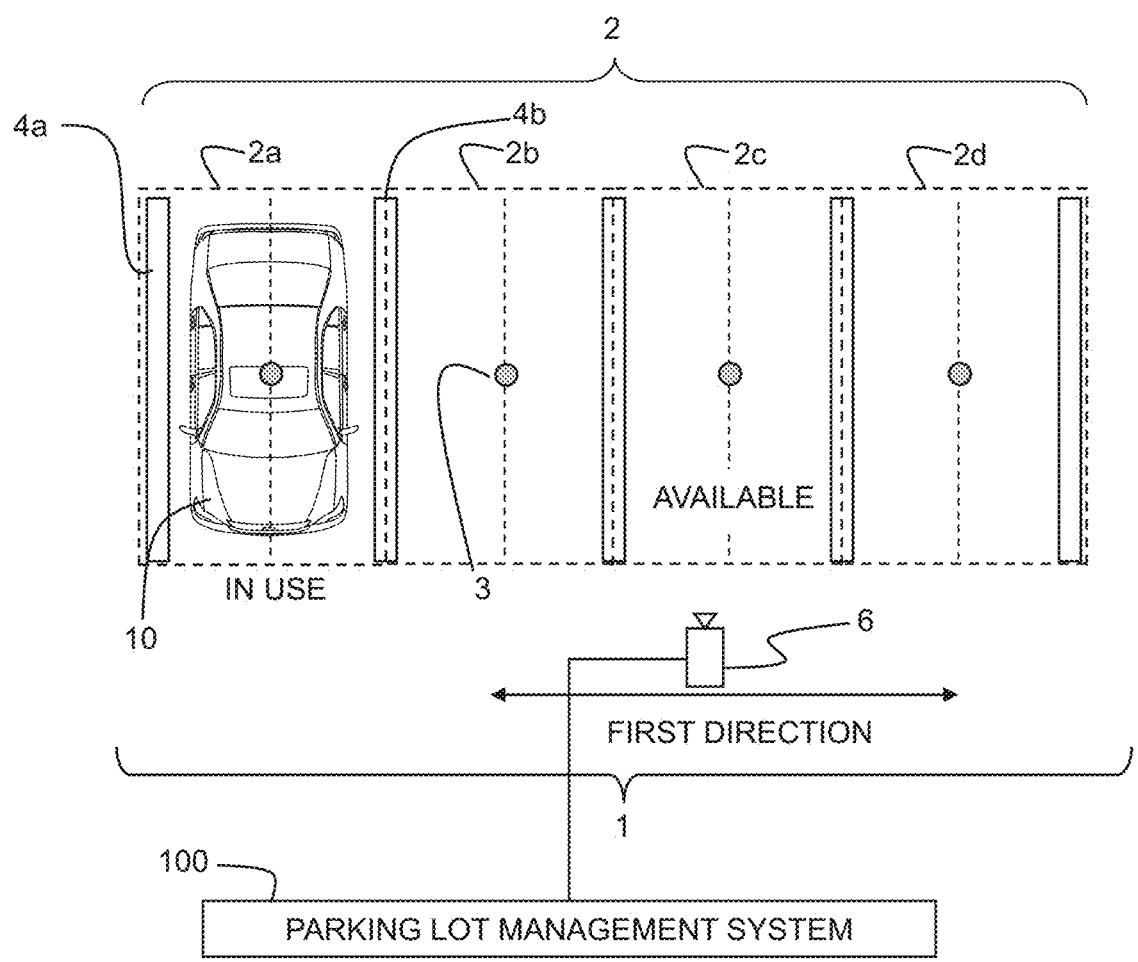
FIG. 2 is a conceptual diagram for explaining an example of a method for determining a usage status of each parking space.

FIG. 2 is a conceptual diagram for explaining an example of a method for determining the usage status of each parking space 2. A recognition target 3 is provided in each parking space 2. Examples of the recognition target 3 include a marker, a white line, a parking space line 4, a road surface, and the like.

In FIG. 2, the parking space 2a is in use, and the parking spaces 2b to 2d are available. When no vehicle 10 is parked in a parking space 2 (i.e, available), the recognition target 3 provided in the parking space 2 is visible from the camera 6. On the other hand, when a vehicle 10 is parked in a parking space 2 (i.e., in use), the recognition target 3 provided in the parking space 2 is hidden by the vehicle 10 and thus is not visible from the camera 6. Therefore, the parking lot management system 100 is able to determine the usage status of each parking space 2 based on whether or not the recognition target 3 is visible from the camera 6. In other words, the parking lot management system 100 is able to determine the usage status of each parking space 2 based on a result of recognition of the recognition target 3 by the camera 6.

2. Description of Issue

Regarding the determination of the usage status of each parking space 2, if the camera 6 is installed for each parking space 2, costs increase. In terms of costs, it is desirable that the usage status of the plurality of parking spaces 2 can be determined by a single camera 6. However, when the usage status of the plurality of parking spaces 2 is determined by a single camera 6, the following problem is caused.

Figure 3:
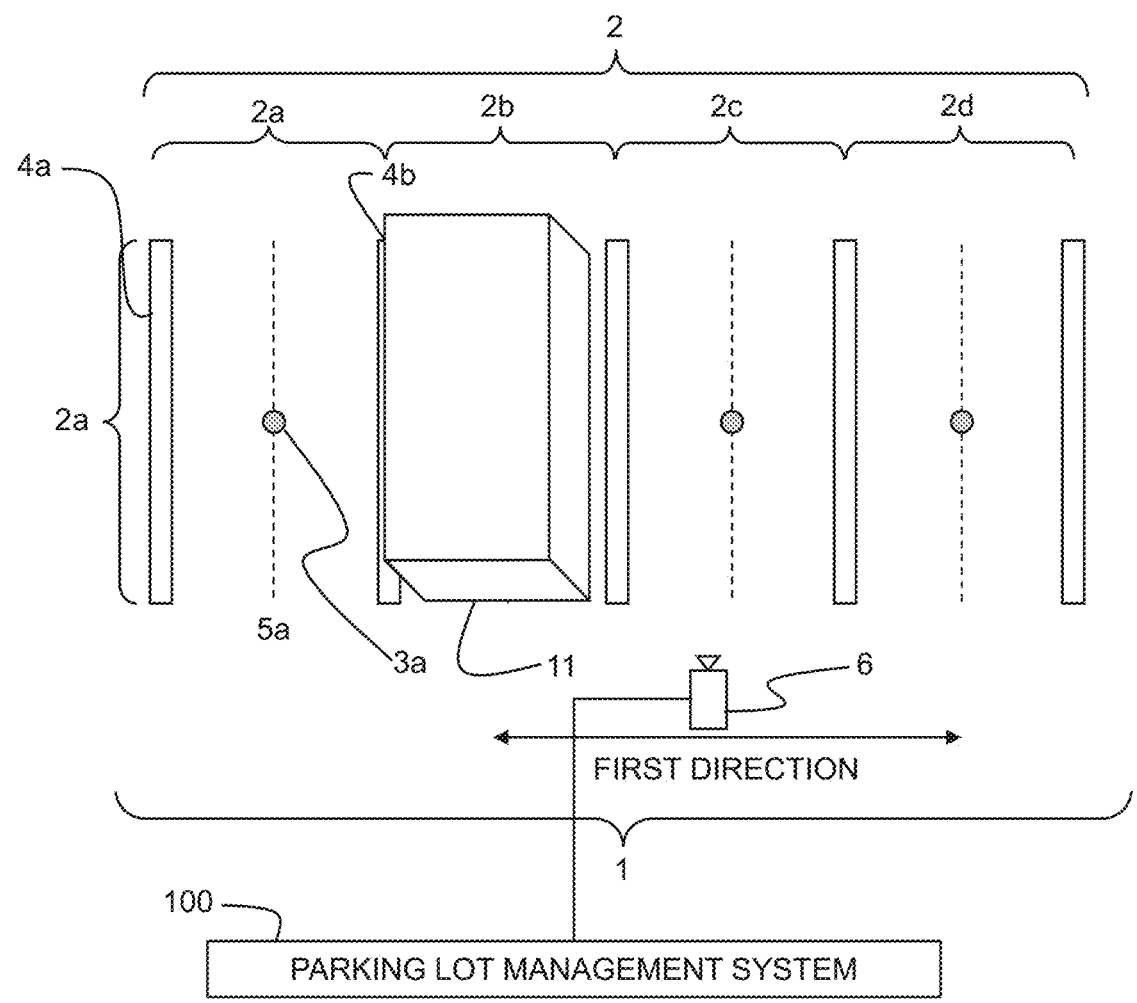
FIG. 3 is a conceptual diagram for explaining a state in which a usage status of a plurality of parking spaces can be determined by a single camera.
Figure 4:
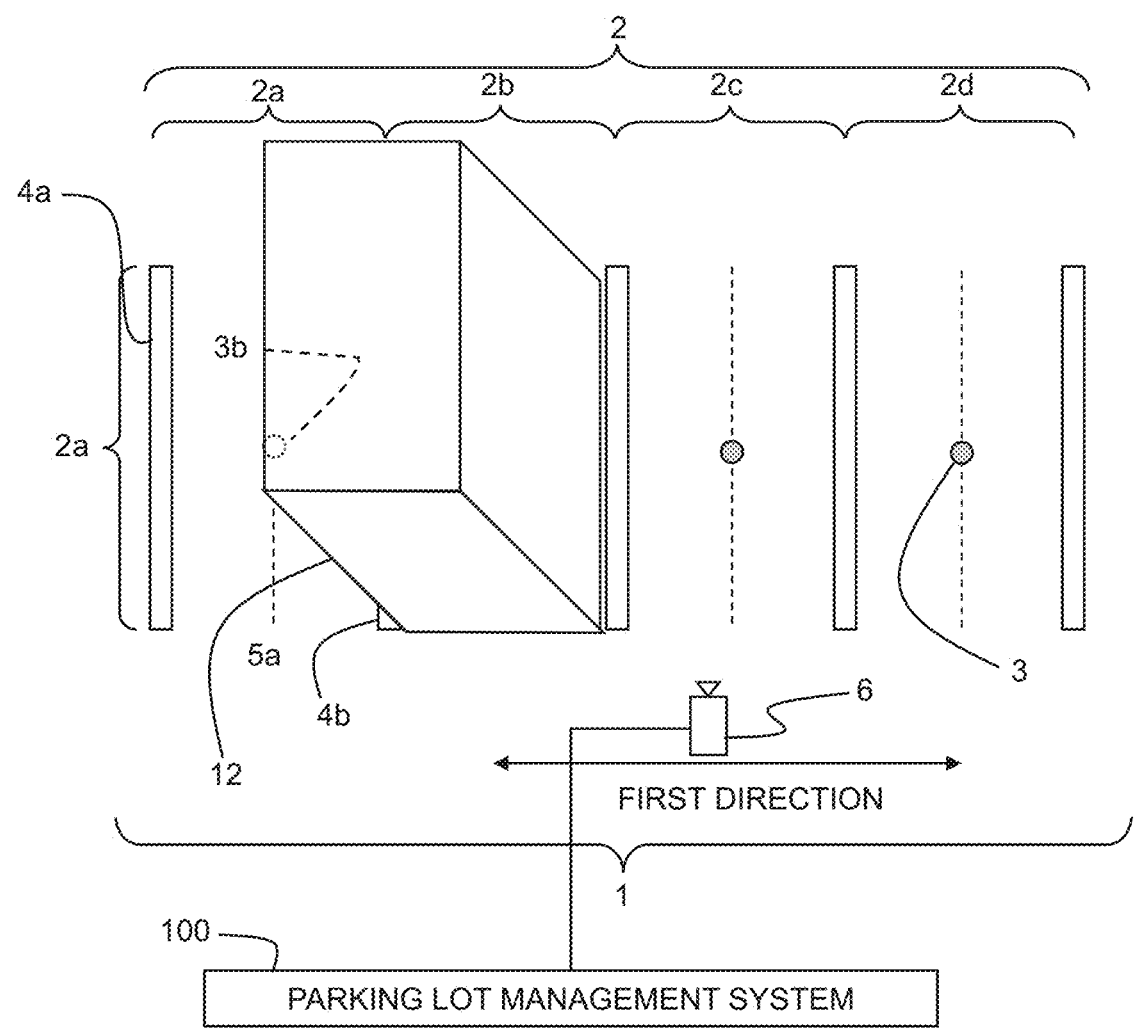
FIG. 4 is a conceptual diagram for explaining a state in which a usage status of a plurality of parking spaces cannot be correctly determined by a single camera.

In FIGS. 3 and 4, the parking spaces 2a and 2b are adjacent to each other. The parking space 2a is relatively far from the camera 6, and the parking space 2b is relatively close to the camera 6. The parking space 2a is available, and a vehicle 10 is parked in the parking space 2b.

In the example shown in FIG. 3, a first vehicle 11 which is relatively low in height is parked in the parking space 2b. When viewed from the camera 6, a recognition target 3a of the parking space 2a is not hidden by the first vehicle 11 parked in the parking space 2b. In this case, the recognition target 3a of the parking space 2a is visible by the camera 6. Therefore, the available parking space 2a is correctly determined as "available."

On the other hand, in the example shown in FIG. 4, a second vehicle 12 which is relatively high is height is parked in the parking space 2b. When viewed from the camera 6, a recognition target 3b of the parking space 2a is hidden by the second vehicle 12 parked in the parking space 2b. That is, due to occlusion caused by the second vehicle 12 parked in the parking space 2b, the recognition target 3b of the adjacent parking space 2a is hidden. In this case, the recognition target 3b of the parking space 2a is not visible by the camera 6. Therefore, the available parking space 2a is erroneously determined to be "in use."

Further, in FIG. 4, allocating an available parking space to a vehicle 10 capable of performing the automated valley parking is considered. Due to the occlusion where a part of the parking space 2a is hidden by the second vehicle 12 parked in the parking space 2b, the parking lot management system 100 erroneously determines that the parking space 2a is "in use." As a result, the parking lot management system 100 cannot allocate the parking space 2a to vehicle 10 capable of performing the automated valley parking. Therefore, it is not possible to effectively utilize the parking space 2a which is actually "available."

Hereinafter, a description will be given of a technique capable of suppressing erroneous determination of the usage status of the parking space 2 when a plurality of parking spaces 2 in the parking lot 1 are monitored by a single camera 6. As described below, according to the present embodiment, an arrangement of the recognition target 3 in the parking space 2 has a feature.

3. Arrangement of Recognition Target in First Embodiment

Figure 5:
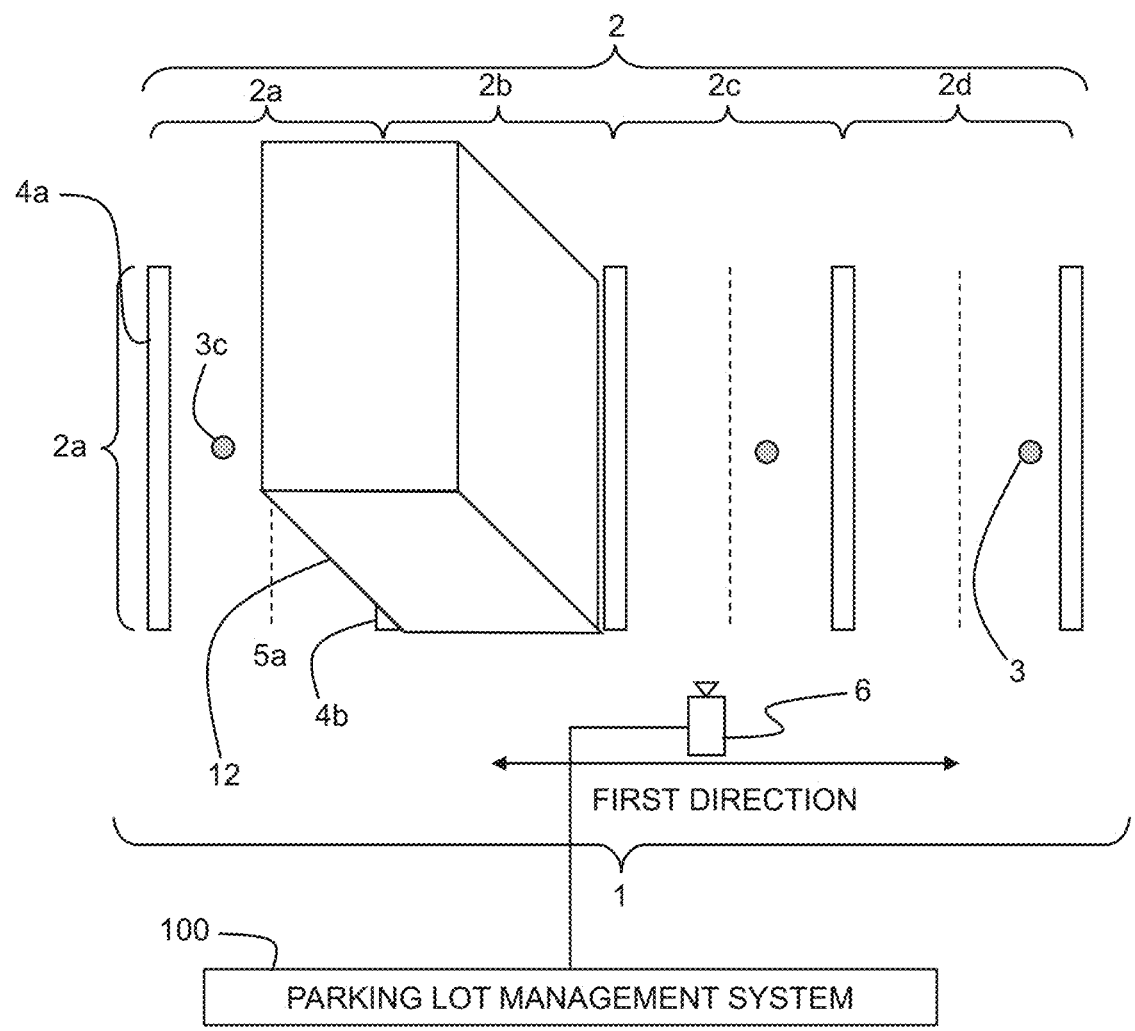
FIG. 5 is a conceptual diagram for explaining a first embodiment of an arrangement of a recognition target in a parking space.

FIG. 5 is a conceptual diagram for explaining a first embodiment of the arrangement of the recognition target 3 in the parking space 2. As in the case of FIG. 4, the second vehicle 12 which is relatively high in height is parked in the parking space 2b in the parking lot 1 disclosed in FIG. 1. The second vehicle 12 hides a part of the parking space 2a when viewed from the camera 6.

A center line 5a of the parking space 2a is a line located at a center between the first parking space line 4-1 (i.e., the parking space line 4b) and the second parking space line 4-2 (i.e., the parking space line 4a). Typically, the center line 5a is parallel to the first parking space line 4-1 (i.e., the parking space line 4b) and the second parking space line 4-2 (i.e., the parking space line 4a), and passes through the center of the parking space 2a. A distance between the center line 5a and the first parking space line 4-1 (i.e., the parking space line 4b) may be equal to a distance between the center line 5a and the second parking space line 4-2 (i.e., the parking space line 4a). It should be noted that the center line 5a may be a virtual line.

According to the present embodiment, a recognition target 3c in the parking space 2a is arranged to be decentered from the center line 5a toward a region on the side of the second parking space line 4-2 (i.e., the parking space line 4a). More specifically, a first region is a region between the center line 5a and the first parking space line 4-1 (i.e., the parking space line 4b), and a second region is a region between the center line 5a and the second parking space line 4-2 (i.e., the parking space line 4a). The recognition target 3c in the parking space 2a is decentered to the second region rather than the first region. In the example shown in FIG. 5, the recognition target 3c in the parking space 2a does is not present in the first region but is present in the second region.

As a result, the recognition target 3c in the parking space 2a is not hidden by the second vehicle 12 parked in the adjacent parking space 2b and thus is easily visible from the camera 6. In other words, a probability that the recognition target 3c in the parking space 2a is hidden due to the occlusion caused by the second vehicle 12 parked in the adjacent parking space 2b is reduced. Therefore, a probability that the parking space 2a is correctly determined to be "available" increases. As described above, even when the plurality of parking spaces 2 are monitored by a single camera 6, it is possible to suppress erroneous determination of the usage status of the parking space 2.

4. Configuration Example of Parking Lot Management System 100

Figure 6:
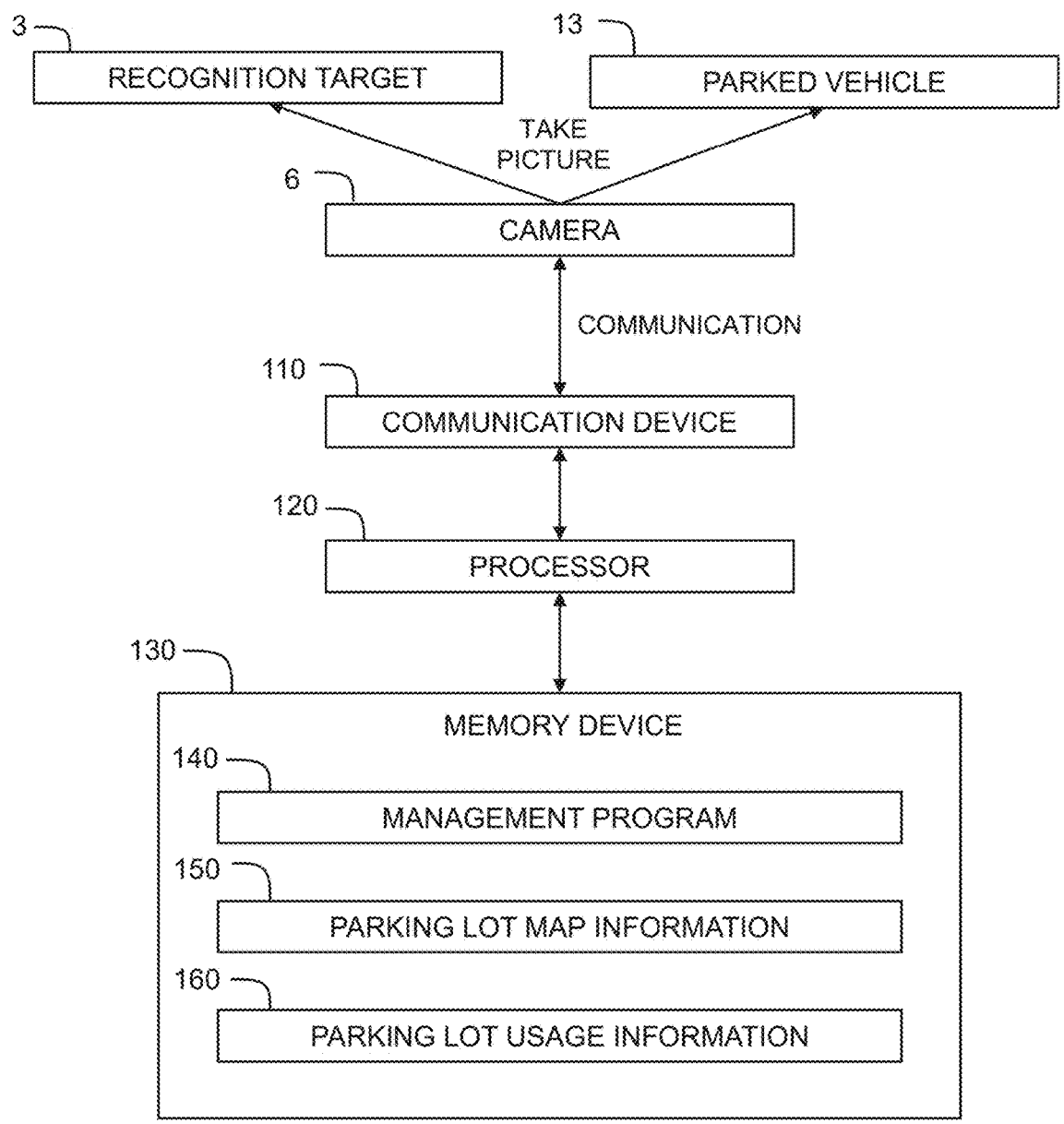
FIG. 6 is a block diagram showing a configuration example of a parking lot management system according to an embodiment of the present disclosure.

FIG. 6 is a block diagram showing a configuration example of the parking lot management system 100 according to the embodiment of the present disclosure.

The parking lot management system 100 manages the parking lot 1. For example, the parking lot management system 100 monitors the parking lot 1 by the use of the camera 6 installed in the parking lot 1. As another example, the parking lot management system 100 may grasp the usage status (available or in use) of the plurality of parking spaces 2 by the use of the camera 6. As still another example, the parking lot management system 100 may allocate an "available" parking space 2 to a vehicle 13 entering the parking lot 1. As still another example, when there is at least one "available" parking space 2, the parking lot 1 may externally display that parking is possible.

The parking lot management system 100 includes a communication device 110, one or more processors 120 (hereinafter simply referred to as a processor 120), and one or more memory device 130 (hereinafter simply referred to as a memory device 130).

The communication device 110 communicates with the camera 6 installed in the parking lot 1. The communication device 110 may communicate with the vehicle 13 in the parking lot 1.

The processor 120 executes a variety of processing. For example, the processor 120 includes a central processing unit (CPU). The processor 120 executes a variety of processing related to the management of the parking lot 1.

The memory device 130 stores a variety of information necessary for the processing by the processor 120. Examples of the memory device 130 include a volatile memory, a nonvolatile memory, a hard disk drive (HDD), a solid state drive (SSD), and the like. The processor 120 reads out a variety of information from the memory device 130 and stores a variety of information in the memory device 130.

A management program 140 is a computer program for managing the parking lot 1. A variety of functions of the parking lot management system 100 (the processor 120) may be implemented by the processor 120 executing the management program 140. The management program 140 is stored in the memory device 130. The management program 140 may be recorded on a non-transitory computer-readable recording medium.

The memory device 130 further stores parking lot map information 150 and parking lot usage information 160. The parking lot map information 150 indicates the arrangement of the parking spaces 2 in the parking lot 1. The parking lot map information 150 may include an image in a state where each parking space 2 is "available." The parking lot usage information 160 indicates the usage status (available or in use) of each parking space 2. The parking lot usage information 160 may include information on the vehicle 10 entering the parking lot 1.

The processor 120 receives an image captured by the camera 6 via the communication device 110. The processor 120 stores the received image in the memory device 130. The processor 120 determines the usage status of each parking space 2 based on the image captured by the camera 6. Then, the processor 120 updates the parking lot usage information 160 based on a result of the determination. Hereinafter, a method of determining the usage status of the parking space 2 by the processor 120 will be described.

5. Determination of Parking Space Usage Status

Figure 7:
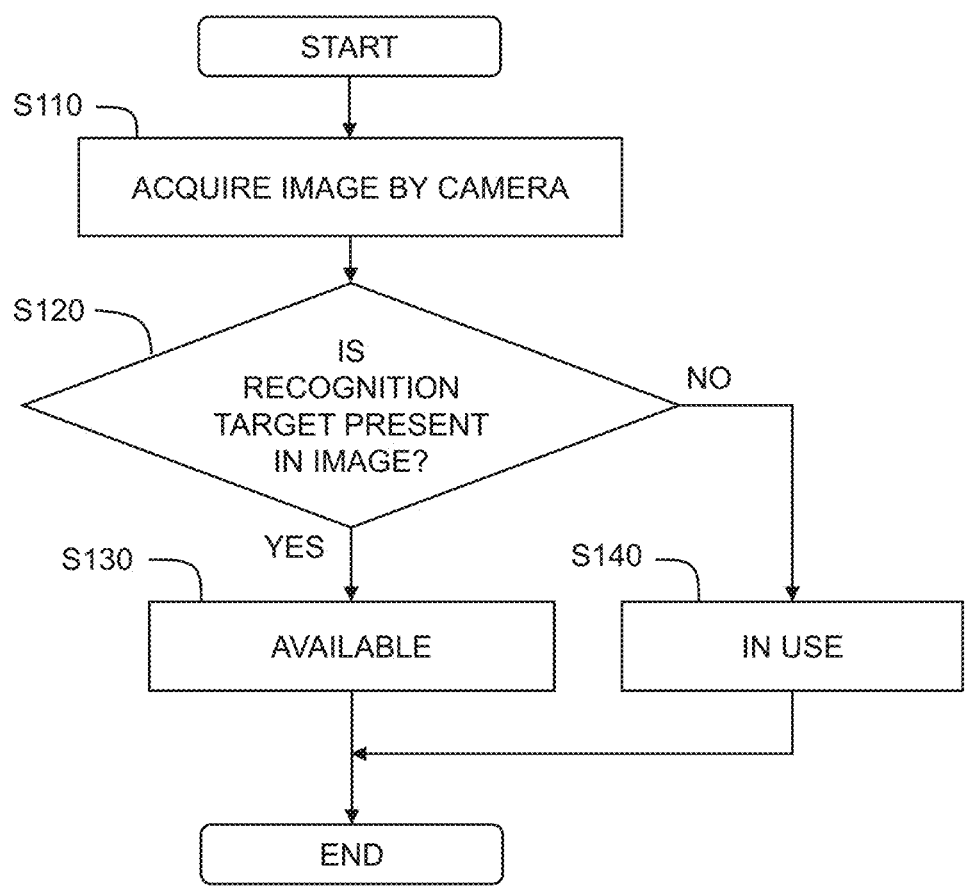
FIG. 7 is a flowchart showing a parking lot management method according to an embodiment of the present disclosure.

FIG. 7 is a flowchart showing a parking lot management method according to an embodiment of the present disclosure. In particular, FIG. 7 shows processing that the parking lot management system 100 (the processor 120) determines the usage status of the parking space 2.

In Step S110, the camera 6 installed in the parking lot 1 takes a picture of the plurality of parking spaces 2 provided in the parking lot 1. The processor 120 acquires the image captured by the camera 6 via the communication device 110. The processing proceeds to Step S120.

In Step S120, the processor 120 determines whether or not the recognition target 3 is present in the image of each parking space 2 acquired in Step S110. For example, the processor 120 performs pattern matching to determine whether or not the recognition target 3 is present in the image of each parking space 2. When the recognition target 3 is present in the image of a parking space 2 (Step S120; Yes), the processor 120 determines that the parking space 2 is "available" (Step S130). On the other hand, when the recognition target 3 is not present in the image of a parking space 2 (Step S120; No), the processor 120 determines that the parking space 2 is "in use" (Step S140).

As a modified example, the Step S120 may be performed in the following manner. The parking lot map information 150 includes an image in a state where each parking space 2 is "available" as a reference image. The recognition target 3 is shown in the reference image. The processor 120 acquires the reference image from the parking lot map information 150. Then, the processor 120 compares the image of the parking space 2 captured by the camera 6 with the reference image. Thus, the processor 120 is able to determine whether or not the recognition target 3 is present in the image of the parking space 2 captured by the camera 6.

As described above, according to the present embodiment, the processor 120 determines the usage status of each parking space 2 based on the result of recognition of the recognition target 3 by the camera 6.

6. Other Embodiments

Figure 8:
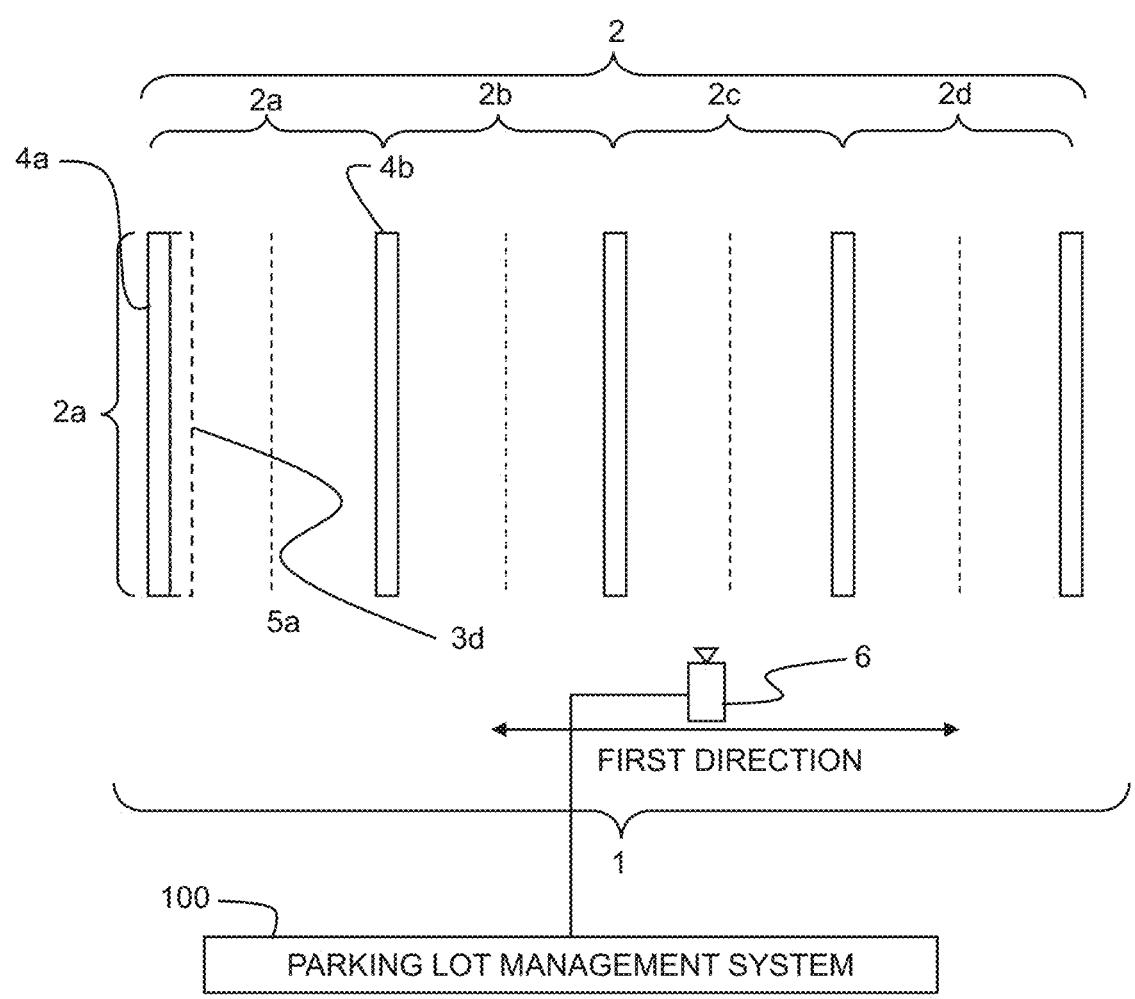
FIG. 8 is a conceptual diagram for explaining a second embodiment of an arrangement of a recognition target in a parking space.

FIG. 8 shows a second embodiment of the recognition target 3. A recognition target 3$d$ regarding the parking space 2$a$ is a road surface that is adjacent to the second parking space line 4-2 (i.e., the parking space line 4$a$) and is on the side of the center line 5$a$ in the parking space 2$a$. For example, the recognition target 3$d$ has a substantially the same width as the second parking space line 4-2 and has a substantially the same length (a length extending in a direction perpendicular to the first direction) as the second parking space line 4-2. The memory device 130 stores a range of the recognition target 3$d$.

The camera 6 is installed such that the entire recognition target 3$d$ is shown in the image when the parking space 2$a$ is in the "available" state.

The parking lot map information 150 includes an image in a state where each parking space 2 is "available" as a reference image. The processor 120 compares the current image with the reference image of the recognition target 3$d$ in the "available" state to check a state of the range in which the recognition target 3$d$ is to be shown in the current image. For example, when there is a color change of a predetermined level or more in the range and the number of pixels whose colors are changed is a predetermined number or more (for example, 80% or more of all pixels), the processor 120 determines that the parking space 2 is "in use."

The determination using the recognition target 3$d$ is particularly effective in the parking space 2 far from the camera 6, such as the parking space 2$a$ or the parking space 2$d$ where the influence of the decrease in visibility due to the occlusion is large in the related art.

Figure 9:
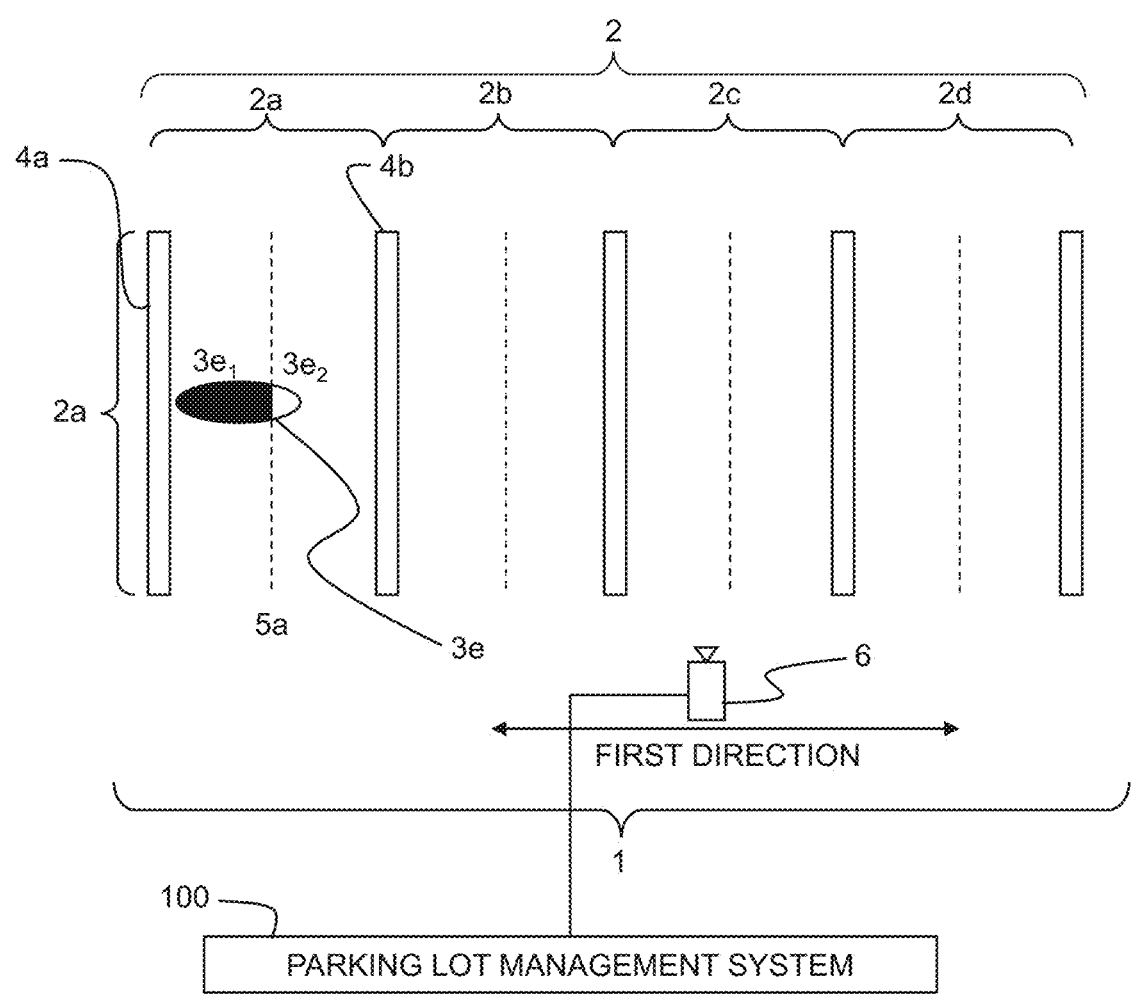
FIG. 9 is a conceptual diagram for explaining a third embodiment of an arrangement of a recognition target in a parking space.

FIG. 9 shows a third embodiment. A recognition target 3$e$ in the third embodiment is arranged so as to straddle the center line 5$a$ in the parking space 2$a$.

Specifically, the recognition target 3$e$ is arranged to be decentered to the region between the second parking space line 4-2 and the center line 5$a$. More specifically, as shown in FIG. 9, the recognition target 3$e$ includes a region 3$e_1$ located between the second parking space line 4-2 and the center line 5$a$ and a region 3$e_2$ located between the first parking space line 4-1 and the center line 5$a$. An area of the region 3$e_1$ is larger than an area of the region 3$e_2$.

In the third embodiment, the processor 120 determines the usage status of the parking space 2 in the same manner as in the first embodiment.

Figure 10:
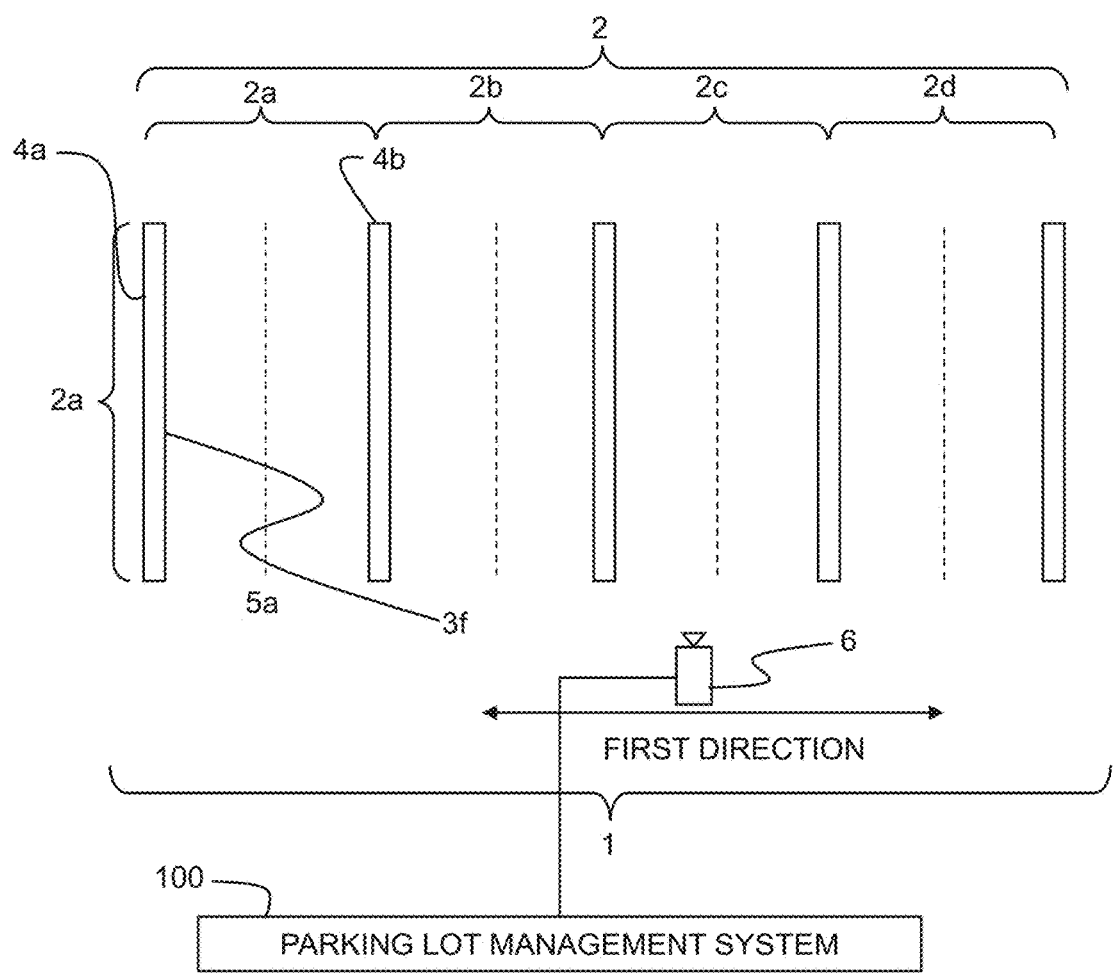
FIG. 10 is a conceptual diagram for explaining a fourth embodiment of an arrangement of a recognition target in a parking space.

FIG. 10 shows a fourth embodiment of the recognition target 3. In the fourth embodiment, the second parking space line 4-2 far from the camera 6 is used as a recognition target 3$f$. For example, with respect to the parking space 2$a$, the parking space line 4$a$ (i.e. the second parking space line 4-2) is used as the recognition target 3$f$.

In the fourth embodiment, for example, a determination method similar to that of the second embodiment is used. In the fourth embodiment, a distance between the parking space 2b and the recognition target 3f is the longest, and a distance between the camera 6 and the recognition target 3f is also the longest. Therefore, the recognition target 3f is visible as long as a whole of the parking space 2a is not hidden by a vehicle 10 parked in the parking space 2b. Therefore, the influence of the reduction in visibility due to the occlusion is the least among all the embodiments, and thus the highest effect can be obtained.

In all the embodiments, the recognition target 3 is arranged to be decentered from the center line 5a between the first parking space line 4-1 and the second parking space line 4-2 toward a region on the side of the second parking space line 4-2. Such the decentered arrangement brings effects.

It should be noted that a combination of two or more embodiments described above is also possible.

What is claimed is:

1. A parking lot comprising:
   a plurality of parking spaces arranged in series in a first direction;
   a camera configured to take a picture of the plurality of parking spaces; and
   a recognition target provided in each of the plurality of parking spaces, wherein
   a usage status of each of the plurality of parking spaces is determined based on a result of recognition of the recognition target by the camera,
   each of the plurality of parking spaces includes a first parking space line and a second parking space line,
   the first parking space line is located closer to the camera than the second parking space line is in the first direction, and
   the recognition target is arranged to be decentered from a center line between the first parking space line and the second parking space line toward a region on a side of the second parking space line,
   wherein the recognition target is not present in a first region between the first parking space line and the center line, and is present in a second region between the second parking space line and the center line.

2. A parking lot management system for managing a parking lot,
   the parking lot management system comprising one or more processors, wherein the parking lot includes:
   a plurality of parking spaces arranged in series in a first direction;
   a camera configured to take a picture of the plurality of parking spaces; and
   a recognition target provided in each of the plurality of parking spaces, wherein
   each of the plurality of parking spaces includes a first parking space line and a second parking space line,
   the first parking space line is located closer to the camera than the second parking space line is in the first direction,
   the recognition target is arranged to be decentered from a center line between the first parking space line and the second parking space line toward a region on a side of the second parking space line, and
   the one or more processors are configured to determine a usage status of each of the plurality of parking spaces based on a result of recognition of the recognition target by the camera,
   wherein the recognition target is not present in a first region between the first parking space line and the center line, and is present in a second region between the second parking space line and the center line.

3. A parking lot management method for managing a parking lot, wherein
   the parking lot includes:
   a plurality of parking spaces arranged in series in a first direction;
   a camera configured to take a picture of the plurality of parking spaces; and
   a recognition target provided in each of the plurality of parking spaces, wherein
   each of the plurality of parking spaces includes a first parking space line and a second parking space line,
   the first parking space line is located closer to the camera than the second parking space line is in the first direction, and
   the recognition target is arranged to be decentered from a center line between the first parking space line and the second parking space line toward a region on a side of the second parking space line,
   the parking lot management method comprising: determining a usage status of each of the plurality of parking spaces based on a result of recognition of the recognition target by the camera,
   wherein the recognition target is not present in a first region between the first parking space line and the center line, and is present in a second region between the second parking space line and the center line.

* * * * *